US012105592B2

(12) United States Patent
Patodia et al.

(10) Patent No.: US 12,105,592 B2
(45) Date of Patent: Oct. 1, 2024

(54) INCREASING AVAILABILITY OF A MICRO-COMPUTATION DECISION SERVICE BY UTILIZING EXECUTION FLOW CONFIGURATIONS

(71) Applicant: PAYPAL, INC., San Jose, CA (US)

(72) Inventors: Prabin Patodia, Bangalore (IN); Rajendra Bhat, Bangalore (IN)

(73) Assignee: PAYPAL, INC., San Jose, CA (US)

(*) Notice: Subject to any disclaimer, the term of this patent is extended or adjusted under 35 U.S.C. 154(b) by 70 days.

(21) Appl. No.: 17/891,924

(22) Filed: Aug. 19, 2022

(65) Prior Publication Data

US 2024/0061747 A1    Feb. 22, 2024

(51) Int. Cl.
*G06F 11/00* (2006.01)
*G06F 9/48* (2006.01)
*G06F 11/14* (2006.01)

(52) U.S. Cl.
CPC ........ *G06F 11/1415* (2013.01); *G06F 9/4881* (2013.01); *G06F 2201/805* (2013.01)

(58) Field of Classification Search
CPC ............. G06F 11/1415; G06F 11/1402; G06F 11/1476; G06F 11/1479; G06F 11/1492; G06F 11/1497; G06F 11/302; G06F 9/4881; G06F 2201/805
See application file for complete search history.

(56) References Cited

U.S. PATENT DOCUMENTS

| | | | |
|---|---|---|---|
| 8,806,490 B1* | 8/2014 | Pulsipher | G06F 11/0793 718/100 |
| 9,298,539 B1* | 3/2016 | Kruck | G06F 11/0715 |
| 2016/0098292 A1* | 4/2016 | Boutin | G06F 9/4881 718/104 |
| 2023/0029198 A1* | 1/2023 | Guevin | G06F 9/4881 |

* cited by examiner

*Primary Examiner* — Joseph D Manoskey
(74) *Attorney, Agent, or Firm* — Haynes and Boone, LLP

(57) ABSTRACT

There are provided systems and methods for increasing availability of a micro-computation decision service by utilizing execution flow configurations. A service provider, such as an electronic transaction processor for digital transactions, may utilize different decision services that implement rules and/or artificial intelligence models for decision-making of data including data in production computing environment. A decision service may normally be used for data processing and decision-making through an execution flow configuration and/or graph identifying a flow of task executions and other computing operations.

20 Claims, 5 Drawing Sheets

INCREASING AVAILABILITY OF A MICRO-COMPUTATION DECISION SERVICE BY UTILIZING EXECUTION FLOW CONFIGURATIONS

TECHNICAL FIELD

The present application generally relates to calls to re-run processing nodes and tasks after a failure and more particularly to dynamically determining whether to re-run a processing node or task based on execution flow configurations.

BACKGROUND

Users may utilize computing devices to access online domains and platforms to perform various computing operations and view available data. Generally, these operations are provided by service providers, which may provide services for account establishment and access, messaging and communications, electronic transaction processing, and other types of available services. During use of these computing services, the service provider may utilize one or more decision services that implement and utilize coded processing rules and/or artificial intelligence (AI) models for decision-making in real-time data processing, such as within a production computing environment. A particular decision service may be associated with providing decision-making operations within a production computing environment, such as live electronic transaction processing operations with an online transaction processor.

The service provider may utilize decision services, which may correspond to micro-computing services having rules-based and/or machine learning (ML)-based engines, computing nodes, execution paths, and the like to process data requests and loads for different outputs (e.g., authentication, risk or fraud analysis, electronic transaction processing, etc.). On receiving a request, a decision service may begin executing a set of tasks to process the request. However, exceptions, unwanted issues, processing failures, errors, and the like may occur when these tasks are being executed. Some of the causes of these issues may be intermittent, for example, momentary loss of network connectivity to a downstream service, temporary unavailability of the downstream service, threads that may be occupied leading to short timeouts during computation of fetched data, and other intermittent or short-term issues. Thus, this may make the Availability to Business (ATB) of the decision service low during runtime and it would be desirable for service providers to increase availability of decision services.

Figure 1:
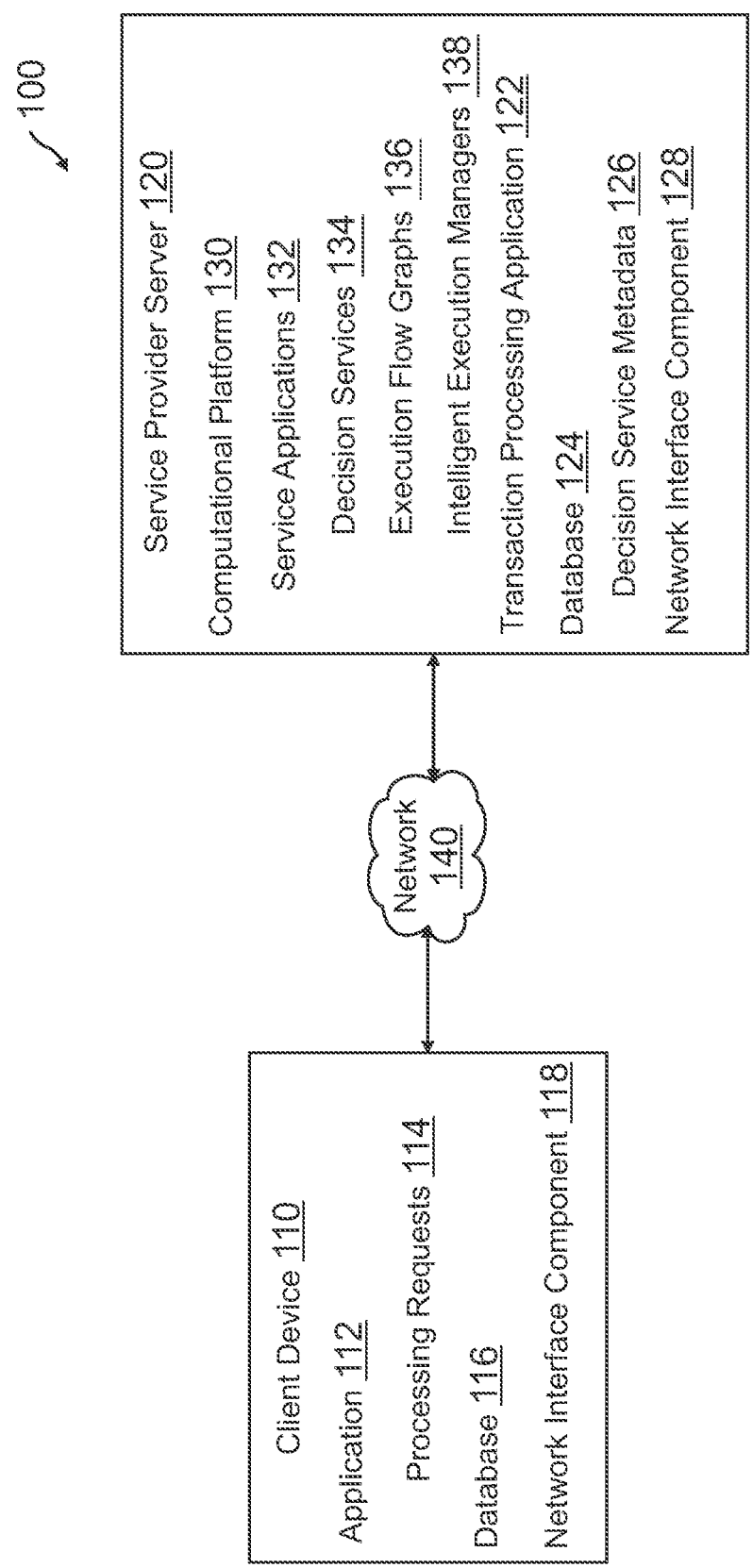
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for increasing availability of a micro-computation decision service by utilizing execution flow configurations. Systems suitable for practicing methods of the present disclosure are also provided.

A service provider may provide different computing resources and services to users through different websites, resident applications (e.g., which may reside locally on a computing device), and/or other online platforms. When utilizing the services of a particular service provider, the service provider may provide decision services for implementing rules and intelligent (e.g., ML or other AI-based) decision-making operations with such services. For example, an online transaction processor may provide services associated with electronic transaction processing, including account services, user authentication and verification, digital payments, risk analysis and compliance, and the like. These decision services may be used to determine if, when, and how a particular service may be provided to users. For example, risk rules may be utilized with a risk engine for a decision service to determine if an indication of fraud is present in a digital transaction and payment, and therefore to determine whether to proceed with processing the transaction or decline the transaction (as well as additional operations, such as request further authentication and/or information for better risk analysis). Thus, decision services automate repeatable decisions based on decision modeling capabilities so that computing services may execute and perform operations requested by a user's computing device.

For example, a user may utilize online service providers, such as transaction processors, via their available online and networked digital platforms. The user may make a payment to another user or otherwise transfer funds using the online platforms of the service providers. In this regard, a user may wish to process a transaction, such as for a payment to another user or a transfer. A user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet.

The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and other transaction processing services. In further embodiments, the service provider and/or other service providers may also provide additional computing services, including social networking, microblogging, media sharing, messaging, business and consumer platforms, etc. These computing services may be deployed across multiple different websites and applications for different operating systems and/or device types. Furthermore, these computing services may utilize the aforementioned decision services when determining decisions during data processing. For example, access and use of these accounts may be performed in conjunction with the aforementioned decision services.

Thus, the user may utilize the account and/or other computing services provided by the service provider via one or more computing devices, such as a personal computer, tablet computer, mobile smart phone, or the like, and may engage in one or more transactions with a recipient, such as a recipient account or digital wallet that may receive an amount of a payment. When engaging in these interactions, the service provider may utilize the corresponding decision services to process data requests and loads and provide a decision or other output. In some environments and/or conditions, a decision service may fail and/or have one or more nodes or operations become non-functional so that a task fails. Conventionally, this may cause the decision service to fail and/or render a failure or error output in response to the request, data load, or data processing being performed. However, as discussed below, if a task fails to execute successfully for one or more reasons, issues, or errors, a system module may intelligently compute and decide if the decision service can re-run the task again instead of failing execution and giving an error back to one or more clients.

In this regard, a decision service may include different data processing nodes or services (e.g., sub-services that are invoked by the main decision service), where each data processing node may include executable instructions to perform one or more computing tasks that process data from a data processing request and output a response. For example, computing tasks may correspond to executable code, operations, and/or models that may include a client device request processor, a compute for business rules, a data loader, a validation of a data load of the data processing request, a user authenticator, or a response builder for a decision by the decision service, although other tasks may also be used. In this regard, a decision service may include computing tasks that obtain an intended result based on a provided data load for a data processing request. The nodes or services for these computing tasks may be configured to be executed in a desired linked fashion, such as serial, parallel, etc., in one or more execution flows having the processing or execution pathways including the computing tasks. Thus, each of these tasks are connected to form different execution paths that may result in the corresponding decision or output by the decision service. Thereafter, a decision may be output by a decision service based on the responses to each task being executed for the corresponding decision.

These computing tasks may be executed in an order and/or processing flow according to a directed acyclic graph (DAG) or another directed graph or ordering of the computing tasks for execution by the decision service. For example, a DAG or other graph may correspond to a flow between computing tasks that causes output of a decision. Computing tasks may be arranged in an order within a DAG depending on the decision service and/or data processing request, for example, so that certain computing tasks may execute and provide data for processing by later computing tasks. A data processing request may be a request from a client computing device, such as an end user or customer of the service provider system, which may request use of a computing service and provide a data load for processing. For example, a data processing request may be associated with a particular request for use of a service for account login, authentication, electronic transaction processing, risk or fraud, and other ones of the aforementioned computing services. The directed graph may therefore correspond to the execution flow and show the different execution paths for executing the computing tasks in series, parallel, or the like. This may include having nodes for computing tasks connected by edges to show the various paths (e.g., in series, parallel, start, end, etc.) for the execution flow of the decision service.

An intelligent execution manager of the service provider that manages re-runs of failed computing tasks for a decision service may utilize the execution flow and/or directed graph that may be available with metadata and/or other data for the decision service. Further, the intelligent execution manager may interface with a monitoring module and/or database of the decision service to monitor the data processing computing tasks within the decision service. A health monitor may monitor the computing tasks based on execution statistics and requirements for the decision service and the computing tasks of the execution flow for the decision service. This may include a start time and/or end time of the main decision service on receiving a data processing request, currently executing tasks and/or execution flows by the decision service, an average response time for the decision service and/or computing tasks, times to execute the computing tasks (e.g., an average or historical run time for each of the computing tasks), and the like. Such data may be stored as or with the metadata, such as in a time out configuration database or other data store. Further, the metadata and/or database may include a service level agreement (SLA) of the decision service, which may indicate and/or designate the level of service to provide end users, customers, and the like. An SLA may indicate a minimum, maximum, and/or average response time to a request for data processing and/or data load. Execution of the data processing computing tasks may be performed in accordance with the SLA, such as by limiting or designated whether a re-run of a failed computing task may be performed and/or a number of re-runs that may be performed until a failure or error result is returned based on the requirements of the SLA.

As previously discussed, decision services may fail or timeout due to data processing errors, computing attacks, network connectivity errors or issues in data transmissions, and other events. A service provider may utilize the intelligent execution manager to detect a failure of one or more data processing computing tasks and determine whether one or more re-runs may be performed and/or successful. The intelligent execution manager may include one or more rules-based engines or ML model-based engines. Failovers or failures, as used herein, may correspond to any condition that results in the decision service and/or one or more data processing computing tasks of the decisions service not being able to process data at all or not being able to process transactions, as well as within certain thresholds, such as accuracy and/or time thresholds (e.g., timeout). This may also include receiving a failure or error response, as well as other unsuccessful responses.

Thus, when a failure occurs with the production computing environment caused by the decision service, such as when a computing task fails or times out, the intelligent execution monitor may utilize, based on the metadata, the execution flow, the SLA, and/or other data to determine whether one or more computing tasks may be re-run. A re-run of a computing task may be selected, approved, and/or performed in response to determining that an execution time of the failed computing task is less than or the same as an execution time of another computing task and/or execution path being executed in parallel or simultaneously. In some embodiments, these two different tasks and paths may converge at a further task or path, and therefore the further task may require an output by each task path prior to initiating and/or executing. However, each task and path may have different execution times or times to process, execute the task(s), and/or complete data processing. Thus, re-runs may be possible where SLA and/or output by the decision service would not be adversely impacted by re-running the failed computing task in the interim time while the other computing task and path completes.

For example, an execution flow may request that a computing task and/or service (which has failed) processes certain data or requests, while one or more other computing tasks process other data or requests. The time for execution of the failed computing task may be 3 milliseconds (ms) for that computing path being executed in parallel or at the same time. In contrast, the concurrently executing computing task(s) and/or path(s) may have a longer time to execute, such as greater than 10 ms. The SLA may further include a maximum response time of 100 ms for the decision service. Thus, the intelligent execution manager may determine one or more re-runs may be performed during the 10 ms and would not adversely affect the SLA to cause a failure or error. Multiple re-runs may be requested and/or performed if possible. In some embodiments, time to identify the failure, determine a re-run is possible, and request the re-run may also be considered when determining if a re-run is possible in the pending time frame or period for execution of the other path(s). Further, the intelligent execution manager may consider historical and other available data to determine whether a re-run may be successful and/or should be requested. This may be based on a likelihood of success, which may be scored and/or compared to a threshold. The likelihood of success of the re-run may be based on historic re-runs of the task and/or paths for the execution flow, failures of the computing task and/or other computing tasks or paths, a success rate of historic re-runs, historical re-run times, cause of the failure and/or upstream or downstream events that may cause the failure, error patterns in such events, other called computing services that may be online or in a failover state, and the like.

Re-runs may be determined and balanced to minimize impacting the overall execution of the decision service statistics and operational measurements for client devices (e.g., when requesting data processing and other decision services, which may be based on service level agreements). When the intelligent re-run service is deployed, the module may generate and/or determine the execution paths for the decision service along with the metadata for the decision service and execution paths, such as the relationship/links of the tasks/paths and the like. During decision service execution, if any issue occurs, the module may access the execution context along with the metadata generated during deployment to determine if a re-run is possible without an overall impact to the decision service and processing outputs or SLAs. This may improve ATB of a decision service by utilizing execution flow configurations.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a user to access a computing service or resource provided by service provider server 120, where service provider server 120 may provide various data, operations, and other functions to client device 110 via network 140. These computing services may utilize decision services for decision-making during data processing. In this regard, client device 110 may be used to access a website, application, or other platform that provides computing services. Service provider server 120 may provide computing services that process data and provide decisions in response to data processing request via decision services, where the decision services may re-run failed computing tasks using an intelligent execution manager to manage those re-runs based on times to execute, metadata, directed graphs or execution flows, and/or SLAs.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS® and/or other headsets including metaverse configured headsets), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and utilizing computing services provided by service provider server 120. In this regard, application 112 may correspond to specialized software utilized by a user of client device 110 that may be used to access a website or application (e.g., mobile application, rich Internet application, or resident software application) that may display one or more user interfaces that allow for interaction with the computing services of service provider server 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider server 120 or other entity.

Application 112 may be associated with account information, user financial information, and/or transaction histories. However, in further embodiments, different services may be provided via application 112, including social networking, media posting or sharing, microblogging, data browsing and searching, online shopping, and other services available through service provider server 120. Thus, application 112 may also correspond to different service applications and the like. When utilizing application 112 with service provider server 120, application 112 may request processing of a processing request 114, such as by providing a data load for processing request 114 or other data, data endpoints or resources, identifiers, and the like when utilizing one or more computing services of service provider server 120. Processing request 114 may correspond to account login, authentication, electronic transaction processing, and/or use of other services described herein. Processing request 114 may have a corresponding data load that is processed via one or more decision services of service provider server 120 to provide a decision that is used to provide a resulting output and result. As such, application 112 may be used with the decision services of service provider server 120, which may re-run failed execution tasks responsive to determining a success likelihood and time for execution of one or more re-run attempts.

In various embodiments, client device 110 includes other applications as may be desired in particular embodiments to provide features to client device 110. For example, the other applications may include security applications for implementing client-side security features, programmatic client applications for interfacing with appropriate application programming interfaces (APIs) over network 140, or other types of applications. The other applications may also include email, texting, voice and IM applications that allow a user to send and receive emails, calls, texts, and other notifications through network 140. In various embodiments, the other applications may include financial applications, such as banking applications. Other applications may include social networking applications, media viewing, and/or merchant applications.

The other applications may also include other location detection applications, which may be used to determine a location for the user, such as a mapping, compass, and/or GPS application, which can include a specialized GPS receiver that determines location information for client device 110. The other applications may include device interface applications and other display modules that may receive input from the user and/or output information to the user. For example, the other applications may contain software programs, executable by a processor, including a graphical user interface (GUI) configured to provide an interface to the user. The other applications may therefore use devices of client device 110, such as display devices capable of displaying information to users and other output devices, including speakers.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with application 112 and/or the other applications, identifiers associated with hardware of client device 110, or other appropriate identifiers, such as identifiers used for payment/user/device authentication or identification, which may be communicated as identifying the user/client device 110 to service provider server 120. Moreover, database 116 may include data used for processing request 114, such as data that may be provided as a data load processed by service provider server 120.

Client device 110 includes at least one network interface component 118 adapted to communicate with service provider server 120 and/or other devices and servers over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services that utilize decision services for decision-making in an intelligent system to provide responses, output, and/or results to client device 110 based on data processing requests. In this regard, service provider server 120 includes one or more processing applications which may be configured to interact with client device 110. For example, service provider server 120 may deploy decision services that include intelligent execution managers in order to determine whether to re-run failed execution tasks during an execution flow of the decision service. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes computational platform 130, a database 124, and a network interface component 128. Computational platform 130 may correspond to executable processes, procedures, and/or applications with associated hardware. In other embodiments, service provider server 120 may include additional or different modules having specialized hardware and/or software as required.

Computational platform 130 may correspond to one or more processes to execute modules and associated specialized hardware of service provider server 120 to provide computing services for account usage, digital electronic communications, electronic transaction processing, and the like. In this regard, computational platform 130 may correspond to specialized hardware and/or software used by a user associated with client device 110 to utilize one or more computing services through service applications 132, which in turn utilize decision services 134 corresponding to computing microservices for decision-making during runtime. Service applications 132 may include transaction processing application 122 corresponding to electronic transaction processing, payment accounts, payment messaging, and the like. Further, service applications may include social networking, media posting or sharing, microblogging, data browsing and searching, online shopping, and other services available through service provider server 120. Service applications 132 of computational platform 130 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for access and use of the computing services of computational platform 130.

The computing services may be accessed and/or used through a browser application and/or dedicated payment application executed by client device 110, such as application 112 that displays UIs from service provider server 120 for computational platform 130. Such account services, account setup, authentication, electronic transaction processing, and other computing services of service applications 132 for computational platform 130 may utilize decision services 134, such as for authentication, electronic transaction processing, risk analysis, fraud detection, and the other decision-making and data processing required by the aforementioned computing services. Decision services 134 may correspond to main decision services used for decision-making using rules-based and/or AI models and engines.

However, various computing tasks of decision services 134 may fail to execute, return an error, or otherwise not complete. Service applications 132 of computational platform 130 may fail and return a failure or error result in situations where one or more data processing nodes and/or tasks fails (e.g., those nodes fail to execute or complete processing within a decision service that have executable instructions to process one or more computing tasks based on a data load and provide a response used in decision-making). Execution flow graphs 136 may correspond to data, graphs, and/or accessible graph-based data (e.g., from one or more graph database queries) that may result in generating and/or making available a directed graph or other representation of the execution flows for decision services 134. Execution flow graphs 136 may include representations of the nodes for computing tasks connected by edges for the different paths required for processing by decision services 134 that result in an output or decision based on input data and/or requests. Execution flow graphs 136 may be generated based on one or more queries to a graph database and/or graph query system. This may then return data in a graph-based data structure or the like that allows for graph traversals and/or explorations. Execution flow graphs 136 may be used to determine computing tasks that may be run in series, parallel, or the like and whether other computing tasks may be executing when one or more other computing tasks in another execution path has failed.

In this regard, decision services 134 may utilize intelligent execution managers 138 to interact with and detect computing task execution health and/or failures of computing tasks during runtime of decision services 134. Intelligent execution managers 138 may then manage and either request or not request re-running of one or more execution tasks that have failed with one of decision services 134 during a data processing request, such as processing request 114 from client device 110. Intelligent execution managers 138 may therefore determine whether to request and/or execute a re-run of the failed computing task. In order to do so, metadata, such as decision service metadata 126 from database 124 and/or another database or configuration data store may be accessed and processed. Such metadata may include historical and/or average computing task execution time, start and/or finish times historically and/or over a past time period including time periods having specific processing loads or traffic, and other data that may indicate how long it may take for intelligent execution managers 138 to re-run a computing task that has failed. The average node execution time may be skewed or weighted for more recent node execution times, such as a last ten execution times and/or favoring a most recent execution time and linearly or exponentially decreasing weights of each subsequent execution time in the past for the data processing node.

The metadata may also include information about historical success rates of re-runs for the computing task, execution path or flow, and the like. This may include other called services, databases, resources, and/or tasks, as well as other upstream or downstream errors and issues including those associated with network connectivity, data transmissions, computing operation failures or issues, and the like. An SLA may be used to determine a maximum or other time for execution of a corresponding one of decision services 134, which may indicate whether a re-run is possible and/or may or is likely to be completed. Thus, intelligent execution manager 138 may further interact with a data source that provides execution statistics, such as a start time of one of decision services 134 on receiving a data processing request, an average response time, an SLA of the corresponding decision service, and/or a corresponding one of execution flow graphs 136 that may be used to determine if a re-run should be performed. Using the metadata of the execution statistics historically, an SLA, a likelihood of success of a re-run (e.g., determined from the metadata's execution statistics), different times for task and/or path execution (e.g., determined from the metadata's execution statistics), and/or additional data or operations, intelligent execution manager 138 may determine whether one or more re-runs are capable of being performed and/or likely to be successful. Intelligent execution manager 138 may request and/or execute one or multiple re-runs if determined to be performed based on the available data and metadata. For example, decision services 134 may utilize rules and/or a rule-based engine for determining whether a computing task has failed and should be re-run.

In further embodiments, intelligent execution managers 138 may include AI models, such as machine learning (ML) or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models for intelligent execution managers 138, training data may be used to generate one or more classifiers and provide recommendations, predictions, or other outputs based on those classifications and an ML model. The training data may be used to determine input features for training predictive scores for task failure, likelihood of task success on re-run, and/or possibility of task completion within another time constraint (e.g., before another task and/or path completes). For example, ML models for intelligent execution managers 138 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models for intelligent execution managers 138.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models for intelligent execution managers 138 that attempt to classify whether a computing task should be re-run one or more additional times during decision service use. Thus, when ML models for intelligent execution managers 138 are used to perform a predictive analysis and output, the input may provide a corresponding output based on the classifications trained for ML models for intelligent execution managers 138.

ML models for intelligent execution managers 138 may be trained by using training data associated, as well as the aforementioned features for decision services 134, corresponding computing tasks, metadata, and/or execution flow graphs 136. By providing training data to train ML models for intelligent execution managers 138, the nodes in the hidden layer may be trained (adjusted) such that an optimal output (e.g., a classification) is produced in the output layer based on the training data. By continuously providing different sets of training data and penalizing ML models for intelligent execution managers 138 when the output of ML models for intelligent execution managers 138 is incorrect, ML models for intelligent execution managers 138 (and specifically, the representations of the nodes in the hidden layer) may be trained (adjusted) to improve its performance in data classification. Adjusting ML models for intelligent execution managers 138 may include adjusting the weights associated with each node in the hidden layer. Thus, the training data may be used as input/output data sets that allow for ML models for intelligent execution managers 138 to make classifications based on input attributes. The output classifications for an ML model trained for intelligent execution managers 138 may be classifications of likelihood and/or possibility of re-running a computing task without adversely affecting SLAs (e.g., by providing proper time to compute and/or adhering to maximum compute times), minimizing effect on SLAs, impacting decision services 134, providing failures or successes to clients including client device 110 for processing request 114, and/or otherwise improving ATB of decision services 134 (especially during task failure).

Additionally, service provider server 120 includes database 124. Database 124 may store various identifiers associated with client device 110. Database 124 may also store account data, including payment instruments and authentication credentials, as well as transaction processing histories and data for processed transactions. Database 124 may store financial information and tokenization data. Database 124 may further store decision service metadata 126, which may correspond to graphs of nodes (e.g., as vertices) connected by edges to generate pathways that are used to execute data processing nodes in accordance with the graphs. Decision service metadata 126 may also include tracked metadata for times to execute the computing tasks, execution paths, execution flows, and the like, as well as failure rates, success rates, causes for failure, other invoked nodes or upstream/downstream issues and behaviors, and the like. Other information for determining whether to re-run a failed computing task may include SLAs and other data or metadata that may be included or associated with decision service metadata 126.

In various embodiments, service provider server 120 includes at least one network interface component 128 adapted to communicate client device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
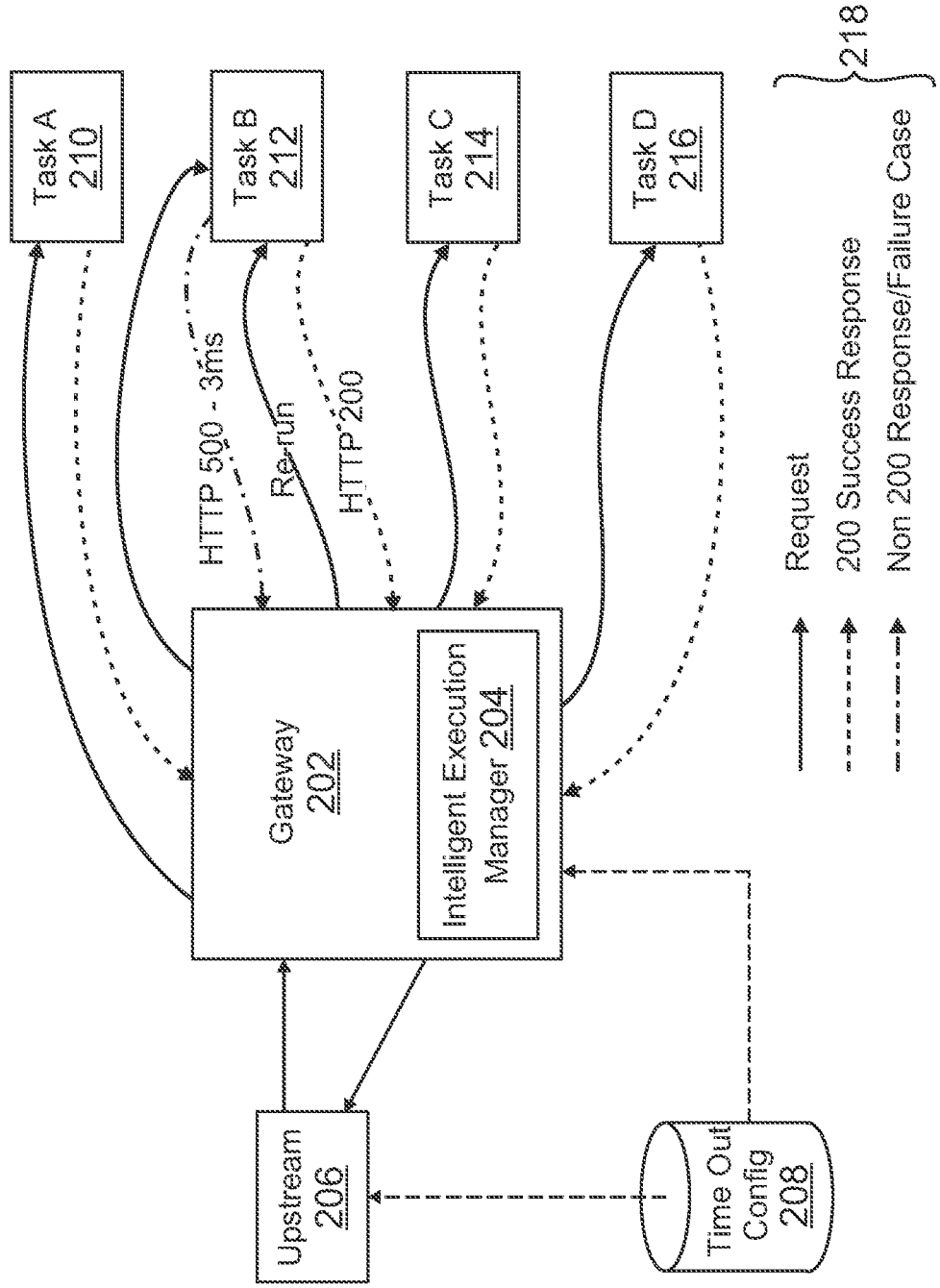
FIG. 2 is an exemplary system environment where an intelligent execution manager may manage re-runs of task executions based on decision service metadata and service level agreements, according to an embodiment.

FIG. 2 is an exemplary system environment 200 where an intelligent execution manager may manage re-runs of task executions based on decision service metadata and service level agreements, according to an embodiment. System environment 200 of FIG. 2 includes a gateway 202 for an intelligent execution manager 204, such as one of intelligent execution managers 138 discussed in reference to system 100 of FIG. 1. In this regard, a client device, such as client device 110 discussed in reference to system 100, may access gateway 202 from an upstream source 206, where a time out configuration database 208 may be used by gateway 202 and upstream source 206 for determination of whether to re-run a failed execution of a computing task using intelligent execution manager 204.

In system environment 200, the client device initially requests data processing, such as by providing one or more data loads via a computing service that requires action from a service provider. A decision service corresponding to gateway 202 may be invoked in order to process a data processing request and provide a decision used when responding to the client device. In this regard, the decision service includes gateway 202 that may be responsible for service and/or task orchestrations and consolidation of task executions during runtime. For example, gateway 202 may use a direct graph or other representation of an execution flow having execution paths in series and/or parallel, where the execution paths include a flow or path of execution of one or more computing tasks in each execution flow. Intelligent execution manager 204 further connects and communicates with a task A 210, a task B 212, a task C 214, and a task D 216 to perform metadata and health monitoring and/or determination of when a computing task fails. Intelligent execution manager 204 may receive information about DAGs and other executable processing flows for task A 210, task B 212, task C 214, and task D 216 from one or more internal components of the decision service, as well as failure of computing tasks, metadata of past or historical computing task executions, failures, and re-runs, and the like. SLAs and other requirements may also be received from internal components where applicable.

Metadata for execution statistics may include current or historical information about the execution times of the decision service and/or task A 210, task B 212, task C 214, and task D 216, the SLAs for the decision service and/or task A 210, task B 212, task C 214, and task D 216, and/or one or more DAGs or another directed graphs for execution flows. Intelligent execution manager 204 may receive execution statistics and information, which may include historical and/or average time to execute different computing tasks and/or paths, processing load and traffic, other called services and/or tasks and their correspond health or failure, and the like. In some embodiments, error data and/or patterns may be monitored, collected, and/or included with the metadata, which may include a bad request downstream, an issue upstream or downstream with another component, or another need that may be required for a re-run of a computing task. Further, flags to delay may indicate required time by another component to complete, process data, come back online or resolve after failure, return data, or otherwise function so that a re-run may be successful, which may be based on a histogram or other historical data and the available time for a re-run. These delay flags may indicate if additional time is needed prior to re-running the computing task to allow for a success scenario.

The average or allowed execution time for task A 210, task B 212, task C 214, and task D 216 may be based on historical execution times and/or one or more SLAs establishing an execution time for each of task A 210, task B 212, task C 214, and task D 216. An SLA may correspond to the required time to respond to a data processing request according to the SLA negotiated between the client device and the corresponding service provider associated with the decision service. In this regard, the SLA corresponds to the maximum amount of time negotiated between devices and/or servers for the required level of service that is provided. For example, an SLA for the decision service may be 100 ms, while an individual one of task A 210, task B 212, task C 214, and task D 216, such as task B 212, may be an average or established time of 3 ms.

Client device 110 may provide a data processing request with a data load (e.g., authentication information, electronic transaction processing information, etc.), and the service provider may utilize the decision service for decision-making. The decision service receives the data processing request, and gateway 202 is invoked and/or executed with task A 210, task B 212, task C 214, and task D 216. When the decision service begins execution and runtime, intelligent execution manager 204 may detect whether one or more of task A 210, task B 212, task C 214, and task D 216 fails. For example, as shown in task request key 218, requests are sent to each of task A 210, task B 212, task C 214, and task D 216. Further, a response is provided by each of task A 210, task B 212, task C 214, and task D 216.

As shown in system architecture 200 of FIG. 2, task A 210, task C 214, and task D 216 provide an HTTP 200 success response and may complete data processing (e.g., does not fail). However, task B 212 initially provides another response, such as a failure response (e.g., HTTP 500 response) or other non-200 success response to the initial request. Intelligent execution manager 204 may then determine if a re-run is possible, likely to be successful, would not violate an SLA agreement, or is otherwise determined to be performed and executed. If so, a secondary request, such as a re-run request of task B 212 is requested by intelligent execution manager 204. This may result in an HTTP 200 success response, which may allow for completion of the processing request by the decision service without proceeding with an error response to the client device. An exemplary determination of whether one or more re-runs is/are to be executed is shown further in FIG. 3 below based on the operations executed by intelligent execution manager 204 based on available metadata, execution flows and graphs, SLAs, and other available data.

Figure 3:
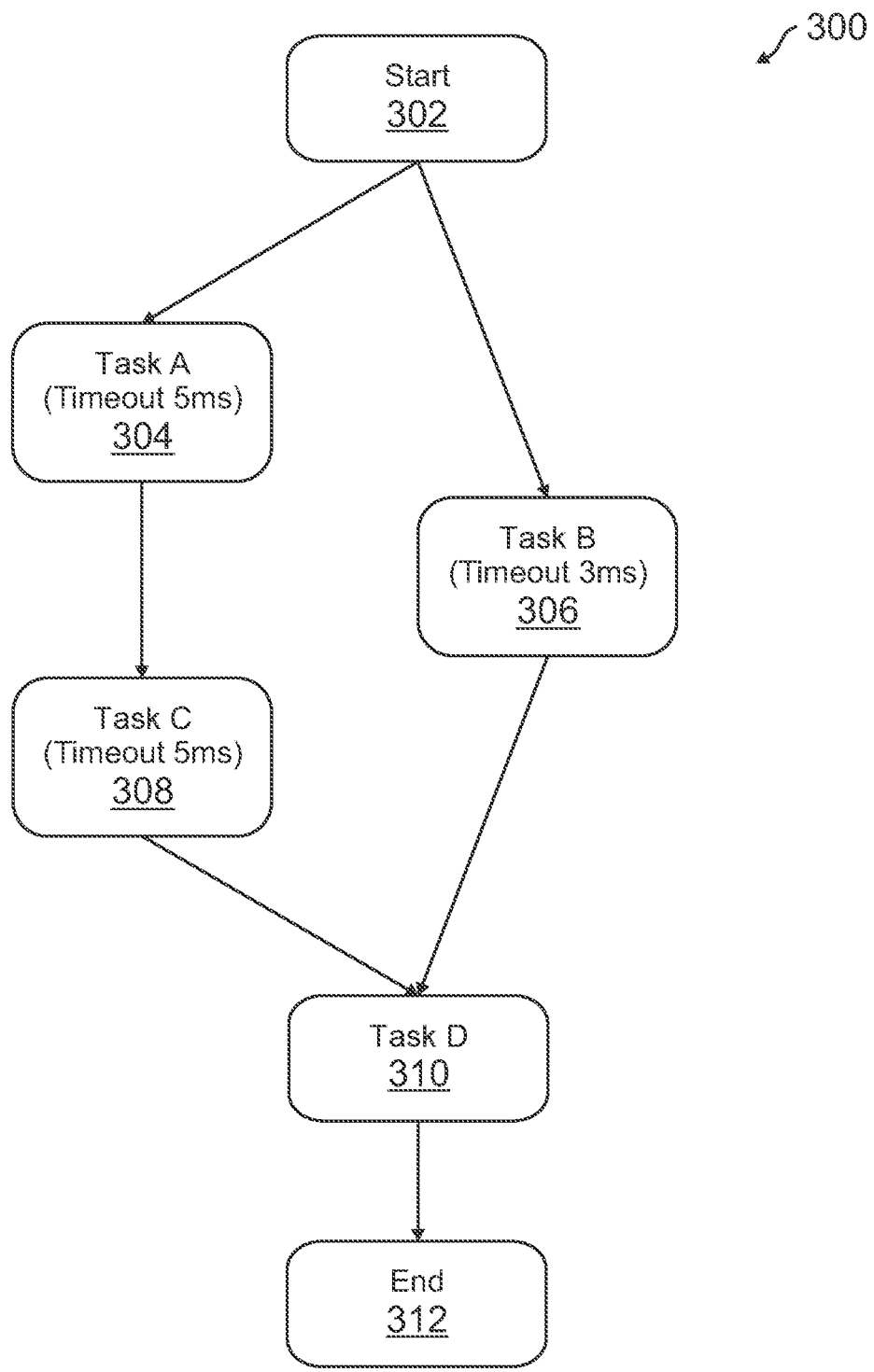
FIG. 3 is an exemplary diagram of an execution flow having multiple pathways where re-runs of failed computing tasks may be performed based on execution times of the computing tasks, according to an embodiment.

FIG. 3 is an exemplary diagram 300 of an execution flow having multiple pathways where re-runs of failed computing tasks may be performed based on execution times of the computing tasks, according to an embodiment. Diagram 300 includes a directed graph for an execution flow, such as one of execution flow graphs 136 for a corresponding one of decision services 134 discussed in reference to system 100 of FIG. 1. Diagram 300 may correspond to an execution flow of a decision service of service provider server 120 that dynamically determines re-runs of computing tasks based on different metadata, SLAs, error data and/or error patterns, delay flags or time amounts to allow a connected or associated service, task, or data source to come back online or resolve an error, and the like during runtime in response to detecting a failure of computing tasks.

In diagram 300, the execution flow having two paths begins are start task 302, which may correspond to an initial input node and/or node being in processed serially after another node. The execution flow includes four computing tasks, a task A 304, a task B 304, a task C 306, and a task D 310 before ending at an end task 312. Each of task A 304, task B 304, task C 306, and task D 310 may correspond to a corresponding node and computing task being required to be executed and processed using data from a request, which may result in an output at end task 312 and/or data for end task 312 to pass to one or more further computing tasks for further processing during operations of the corresponding decision service.

Further, the execution flow branches to two paths, the left side path having task A 304 and task C 308 before converging or rejoining at task D 310, while the left side path includes task B 306 being executed in parallel with the left side having task A 304 and task C 308 before reconverging at task D 310. An SLA and/or metadata for execution times of task A 304, task B 304, task C 306, and task D 310 may establish, for task A 304 and task C 308 an execution time of 5 ms each, while task B 306 is provided an execution time of 3 ms. In this regard, task A 304 and task C 308 are configured to run in sequence having a total time for execution of 10 ms, and task B 306 is configured run in parallel with a total time for execution of 3 ms before converging at task D 310.

In this regard, task D 310 may only start after task B 306 and task C 308 complete. If task B 306 fails due to an issue, data communication error, or other execution problem, and failure happens within 0.5 ms, scenario task B 306 may be re-run again without impacting the overall service SLA and/or execution time of the execution flow while task A 304 and task C 308 complete in the further 10 ms of required and/or allotted time. For example, a sample computation may be: (10 ms−0.5 ms)=9.5 ms that may be re-utilized for re-run of task B 306 in the required 3 ms for task B 306. If task B 306 fails due to a computation issue, such as data not available after 3 ms, in this scenario, task B 306 may also be re-run without impacting the overall service SLA and/or execution time of the execution flow. For example, a sample computation may be: (10 ms−3 ms)=7 ms can be re-utilized for re-run of task B 306 in the required 3 ms for task B 306, including multiple re-runs.

If task B 306 fails due to one or more issues with downstream service (e.g., downtime or overloaded to process a current request or an exception during a processing request) and downstream returns an error within 1.5 ms, in this scenario, task B 306 may be re-run multiple times without impacting the overall service SLA and/or execution time of the execution flow. For example, a sample computation may be: (10 ms−1.5 ms)=8.5 ms can be re-utilized for re-run of task B 306 in the required 3 ms for task B 306, including multiple re-runs. However, if the time for execution of task B 306 meets or exceeds the time for execution of the path having task A 304 and task C 308 (e.g., same or greater than 10 ms), a corresponding intelligent execution manager may not perform the re-run as this may affect decision service availability and/or performance, as well as the SLA. However, the re-run may be performed if the overall SLA may be adhered to, such as a maximum runtime of the decision service. Thus, this allows the decision service to be more widely available even during failures of processing nodes and/or computing tasks during or in certain execution paths.

Figure 4:
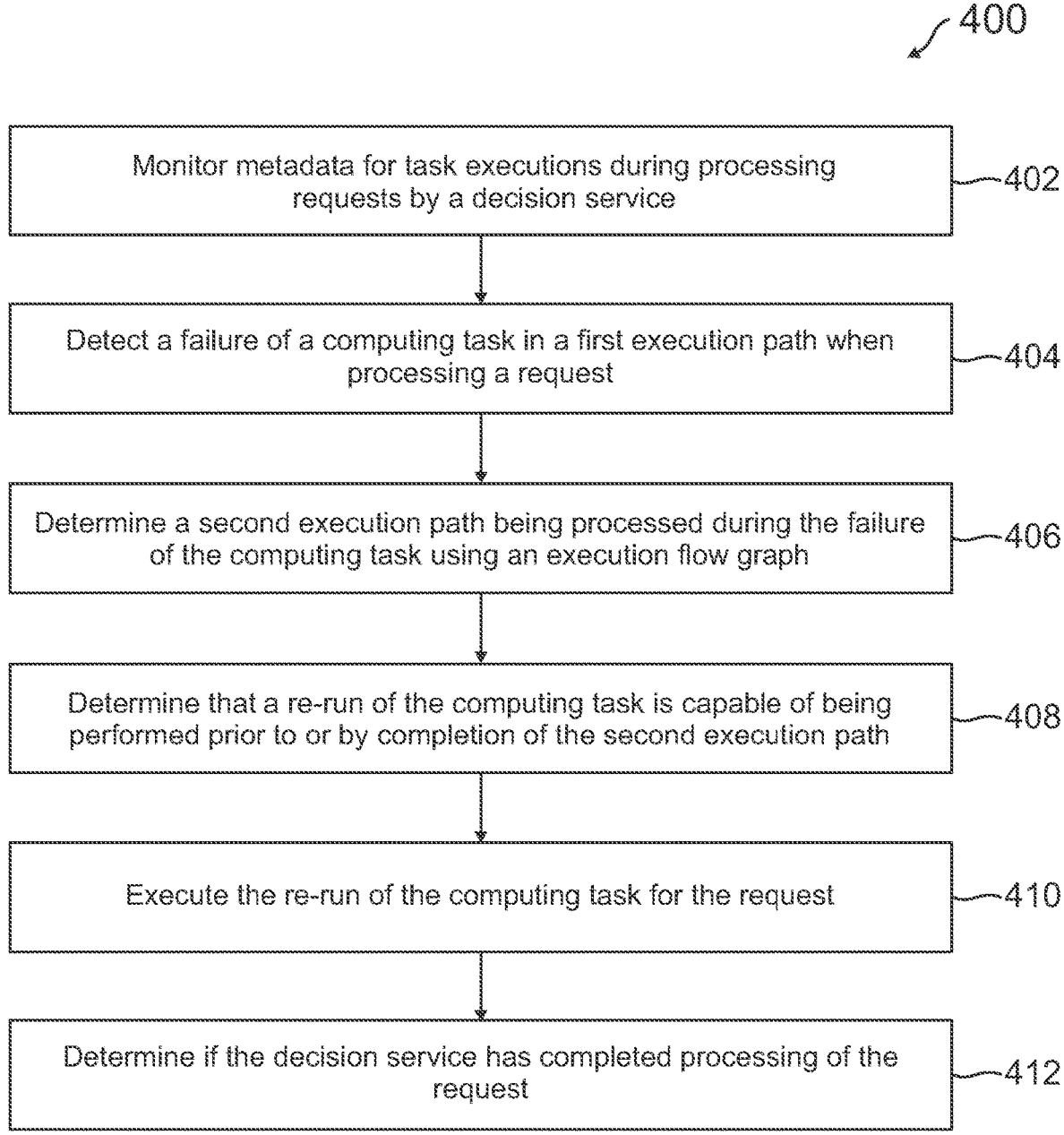
FIG. 4 is a flowchart of an exemplary process for increasing availability of a micro-computation decision service by utilizing execution flow configurations, according to an embodiment.

FIG. 4 is a flowchart 400 of an exemplary process for increasing availability of a micro-computation decision service by utilizing execution flow configurations, according to an embodiment. Note that one or more steps, processes, and methods described herein of flowchart 400 may be omitted, performed in a different sequence, or combined as desired or appropriate.

At step 402 of flowchart 400, metadata is monitored for task executions during processing requests by a decision service. The metadata may be monitored based on the execution times of computing tasks, node health and/or failure rates, failure cause or errors, rate of success and/or re-run success, causes of those successes, and other metadata that may be associated with failure of computing tasks during execution and/or success likelihood of re-running that task in a specific time frame available for re-running. The metadata may be collected and may also include or be associated with additional data, such as DAGs or other directed graphs indicating an execution flow having paths for the ordered and/or sequential execution of tasks, as well as any SLAs indicating decision service and/or task execution times, and the like. At step 404, a failure of a computing task in a first execution path is detected when processing a request. The failure may be caused by one or more operational failures, bad data loads, missing or errors in network communication, connected services or tasks that fail, timeouts by execution time requirements, and/or other issues in data processing and task execution.

At step 406, a second execution path being processed during the failure of the computing task is determined using an execution flow graph. The graph or other representation may correspond to a processable data representation that may be queried, searched, and/or traversed to determine the serial and/or parallel paths of execution of different computing tasks. Thus, a second execution path with one or more computing tasks may also be processed and executed during the failure of the computing task. This may have a corresponding average and/or SLA established time for execution. At step 408, it is determined that a re-run of the computing task is capable of being performed prior to or by completion of the second execution path. This may be based on a computation, by an intelligent execution monitor, of the amount of time available for re-running the computing task before the second execution path completes. Further, the intelligent execution monitor may also determine a likelihood of success and/or other delay flags required prior to re-run of the failed computing task. A decision on whether to re-run may be based on a rules-based and/or ML model-based engine or other processor of the intelligent execution monitor.

At step 410, the re-run of the computing task is executed for the request. The re-run may be requested by the intelligent execution monitor and/or in conjunction with one or more components of the decision service, such as a transformer, consolidator, or other component that may organize and request execution of computing tasks. In some embodiments, multiple re-runs may be queued to be executed in series or sequentially, or may further be requested and executed if further failures occur. At step 412, it is determined if the decision service has completed processing of the request. The decision service and/or service provider may determine whether a failure or error may need to be reported and/or provided to the client device requesting the processing or a system administrator. However, if successful by re-running the computing task, the ATB of the decision service may be improved and fewer errors may result, thereby providing faster and more efficient computing operations for decision services without requiring fully executing the decision service with a new data request or load.

Figure 5:
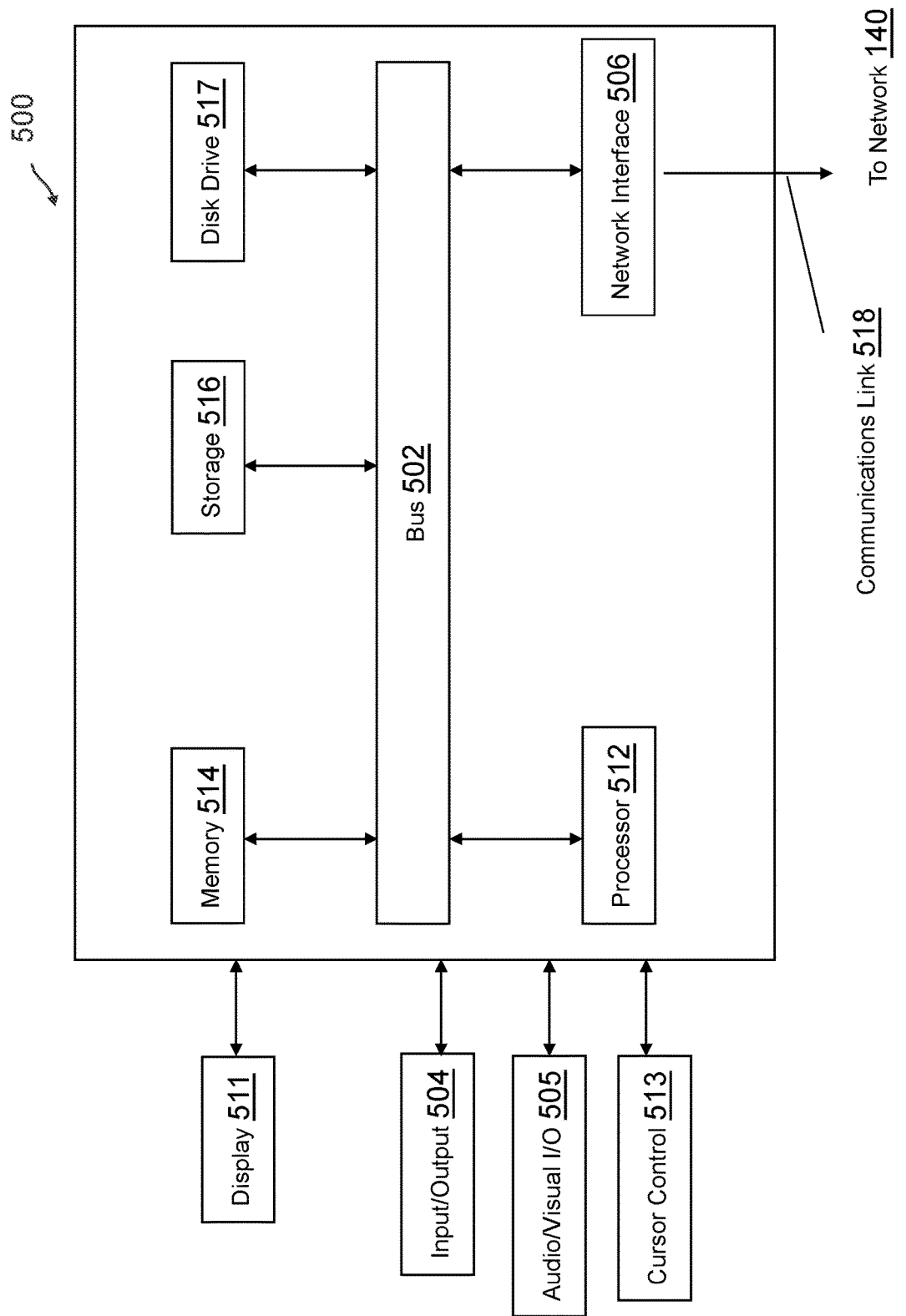
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A system comprising:
a non-transitory memory; and
one or more hardware processors coupled to the non-transitory memory and configured to read instructions from the non-transitory memory to cause the system to perform operations comprising:
  detecting a failure of a first computing task within a first path of an execution flow of a decision service;
  determining a second path having one or more second computing tasks of the decision service, wherein the first path and the second path converge at a third computing task of the execution flow;
  determining that the first computing task is capable of executing a re-run within a time associated with processing the one or more second computing tasks of the second path, wherein the time comprises a first threshold execution time for processing, by the second path, one or more second computing tasks that is less than a second threshold execution time for processing the one or more second computing tasks by the first path, and wherein the first threshold execution time and the second threshold execution time are determined from historical execution times based on metadata for the decision service; and
  executing the re-run of the first computing task during the time associated with processing the one or more second computing tasks.
2. The system of claim 1, wherein the metadata comprises historic re-runs executed by the decision service of one or more paths for the execution flow, failures by at least the first computing task and the one or more second computing tasks, and a success rate of the historic re-runs.

3. The system of claim 1, wherein the determining the second path having the one or more second computing tasks of the decision service comprises:
   accessing a directed graph for the execution flow of the decision service; and
   identifying processing paths of the decision service from the directed graph, wherein the processing paths identify the first path and the second path converging at the third computing task.

4. The system of claim 3, wherein the determining that the first computing task is capable of executing the re-run is based on the metadata for the decision service and the directed graph with a service level agreement for execution times by the decision service.

5. The system of claim 1, wherein the executing the re-run of the first computing task comprises:
   limiting a number of re-runs of the first computing task based on available resources and execution times of the decision service.

6. The system of claim 1, wherein the first path and the second path run in parallel by the decision service to provide data to the third computing task to complete a decision-making processing by the decision service.

7. The system of claim 1, wherein the determining that the first computing task is capable of executing the re-run is performed using an intelligent compute system of the decision service and a historical database for the decision service.

8. The system of claim 7, wherein the intelligent compute system comprises at least one of a rules-based engine or a machine learning (ML) model-based engine.

9. The system of claim 1, wherein the executing the re-run comprises executing a plurality of re-runs successively within the time associated with processing the one or more second computing tasks.

10. The system of claim 1, wherein the metadata includes information indicating average computing task execution times associated with the first computing task during past processing loads of the decision service.

11. The system of claim 1, wherein the first threshold execution time and the second threshold execution time are further determined based on a service level agreement (SLA) associated with the decision service.

12. A method comprising:
   detecting that a first computing task for a decision service has failed, wherein the first computing task is included in a first processing pathway of two processing pathways required by a second computing task of the decision service for an output to a decision-making operation;
   accessing a directed graph for an execution flow of the decision service, wherein the directed graph identifies the two processing pathways required by the second computing task, and wherein the directed graph identifies at least a third computing task required by a second processing pathway of the two processing pathways for the second computing task;
   accessing metadata for execution requirements by the two processing pathways, wherein the metadata comprises error patterns and error data for a plurality of processing tasks of the decision service, and wherein the metadata further comprises upstream services and downstream services called by the plurality of processing tasks;
   determining that a re-run of the first computing task is capable of being performed prior to a completion of the at least one third computing task in the second processing pathway; and
   requesting the re-run of the first computing task.

13. The method of claim 12, wherein the two processing pathways comprise a subset of a plurality of processing pathways designated by the directed graph for processing by the decision service, and wherein the plurality of processing pathways provide data to the second computing task for the decision-making operation.

14. The method of claim 12, wherein the re-run comprises a second execution of the first computing task using a data load after a first execution of the first computing task fails using the data load.

15. The method of claim 12, wherein the determining that the re-run of the first computing task is capable of being performed prior to the completion of the at least one third computing task comprises determining at least two re-runs of the first computing task are capable of being performed and the requesting the re-run comprises requesting the at least two re-runs to be performed sequentially until a completion of the first computing task by the decision service.

16. The method of claim 15, wherein the at least two re-runs are determined based on a processing completion time of the first computing task from historical processing data of the first computing task from the metadata.

17. The method of claim 12, further comprising:
   executing the decision service based on the re-run and the directed graph.

18. The method of claim 12, wherein the directed graph comprises a directed acyclic graph having a plurality of nodes connected by a plurality of edges for processing tasks invoked by the decision service.

19. A non-transitory machine-readable medium having stored thereon machine-readable instructions executable to cause a machine to perform operations comprising:
   determining that a first computing task for a decision service has not completed in a first time associated with processing the first computing task based on metadata for the decision service;
   determining, using a directed graph of computing task execution for the decision service, that at least one second computing task is required to be processed prior to a link in the directed graph between the first computing task and the at least one second computing task;
   determining, based on the metadata, that the first computing task can be completed during a re-run of the first computing task in the first time prior to a second time required for processing the at least one second computing task, wherein the determining that the first computing task can be completed during the re-run is further based on the directed graph with a service level agreement for execution times by the decision service; and
   executing the first computing task based on the determining that the first computing task can be completed in the first time prior to the second time.

20. The non-transitory machine-readable medium of claim 19, wherein the metadata comprises historical execution times of the first computing task and the at least one second computing task, a completion likelihood of the first computing task based on a failure cause of the first computing task, and a computing service called by the first computing task during processing of the first computing task.

\* \* \* \* \*